(12) United States Patent
Huitema et al.

(10) Patent No.: US 8,446,549 B2
(45) Date of Patent: May 21, 2013

(54) COLOR FILTER TO PREVENT COLOR ERRORS IN A ROLL UP DISPLAY

(75) Inventors: Hjalmar Edzer Ayco Huitema, Veldhoven (NL); Petrus Johannes Gerardus Van Lieshout, Beek en Donk (NL)

(73) Assignee: Creator Technology B.V., Breda (NL)

( * ) Notice: Subject to any disclaimer, the term of this patent is extended or adjusted under 35 U.S.C. 154(b) by 737 days.

(21) Appl. No.: 12/091,710

(22) PCT Filed: Nov. 11, 2006

(86) PCT No.: PCT/IB2006/054256
§ 371 (c)(1),
(2), (4) Date: Jun. 19, 2008

(87) PCT Pub. No.: WO2007/063440
PCT Pub. Date: Jun. 7, 2007

(65) Prior Publication Data
US 2008/0284955 A1    Nov. 20, 2008

Related U.S. Application Data

(60) Provisional application No. 60/740,469, filed on Nov. 29, 2005.

(51) Int. Cl.
*G02F 1/1335*    (2006.01)
(52) U.S. Cl.
USPC ........................................................ 349/106
(58) Field of Classification Search
USPC ................... 313/511; 359/296; 349/106–109, 349/187
See application file for complete search history.

(56) References Cited

U.S. PATENT DOCUMENTS

| 5,528,398 | A | * | 6/1996 | Suzuki et al. ................ 349/106 |
| 2002/0041356 | A1 | | 4/2002 | Tanada et al. |
| 2002/0047960 | A1 | | 4/2002 | Ono |
| 2004/0052037 | A1 | * | 3/2004 | Sawyer ........................ 361/681 |
| 2004/0070706 | A1 | | 4/2004 | Freeman |
| 2004/0263722 | A1 | * | 12/2004 | Oh et al. ...................... 349/106 |
| 2004/0263764 | A1 | * | 12/2004 | Kim et al. .................... 349/155 |
| 2007/0200979 | A1 | * | 8/2007 | Rudin et al. ................. 349/106 |

FOREIGN PATENT DOCUMENTS

| JP | 5-61024 | 3/1993 |
| JP | 2005-526296 | 9/2005 |
| WO | WO 2004/003645 A1 | 1/2004 |
| WO | WO 2004/088490 A2 | 10/2004 |
| WO | WO 2004088490 A2 * | 10/2004 |

OTHER PUBLICATIONS

International Search Report for PCT/IB2006/054256 Feb. 4, 2007.
Korea Patent Office, Office Action, Patent Application Serial No. 10-2008-7015595, Dec. 18, 2012, Korea.

\* cited by examiner

*Primary Examiner* — Richard Kim
*Assistant Examiner* — Michael Inadomi

(57) ABSTRACT

A conformable, flexible or roll up display (100) includes a matrix display layer (115) including lines of sub-pixels (116). Each line has an associated color assigned to the line (132, 134, 136), and each line extends along a roll up or bend direction (140). A display effect layer (128) is formed on the matrix layer. A color filter layer (152) includes striped color filters (154) which extend in the roll up or bend direction. The striped color filters each include a filter color corresponding with the lines of sub-pixels in the matrix layer to address misalignment and color errors due to bending or rolling up the display. Methods for fabricating flexible displays are also disclosed.

10 Claims, 7 Drawing Sheets

COLOR FILTER TO PREVENT COLOR ERRORS IN A ROLL UP DISPLAY

FIELD OF THE INVENTION

This disclosure relates to flexible displays, and more particularly to devices and methods for forming color filters on such displays.

BACKGROUND

Flat panel displays include color filters to remove particular color components from light illuminating from sub-pixels of the display. Non-intrinsic color displays include a display effect layer, which reflects or emits light with a broad spectrum (white), and a color filter layer, which changes the white light into colored light. The display effect layer and the color filter layer need to be properly aligned to prevent parallax or aperture problems. When making a conformable, flexible or even roll-up display in this way, alignment problems between the display effect layer and the color filter layer can occur due to the different radii of these layers during bending or rolling.

Referring to FIG. 1, an illustrative roll up display 10 is shown to illustrate alignment between pixel structures 22 in an active matrix layer 12 and color filters 14, 16, and 18 in a color filter layer 20. Pixel structures 22 reflect or emit white light which passes through a display effect layer 15 and then an appropriately aligned color filter 14, 16 or 18 corresponding to each sub-pixel 22. Three sub-pixels 22 form a pixel image that includes a red, green and blue components supplied by color filters 14, 16 and 18 respectively. Lines 24 are shown to illustrate alignment between sub-pixels 22 and color filters 14, 16 and 18.

Referring to FIG. 2, display 10 is shown being rolled up onto a roller or spool 30. Due to the radius of the spool 30, misalignment occurs between color filters 14, 16 and 18 and sub-pixels 22. Misalignment between color filters 14, 16 and 18 in layer 20 and sub-pixels 22 is illustrated by lines 24. The misalignment can cause parallax problems, decrease brightness and cause color errors and moiré effects in the displayed image.

SUMMARY OF THE INVENTION

Embodiments of the present disclosure describe color filters formed or applied to a conformable, roll up or flexible display. A rollable/flexible color display has a display effect layer, reflecting or emitting white light, combined with a color filter layer. Colored sub-pixels of the display are arranged into rows or columns in a roll-up direction.

Embodiments may include active and/or passive-matrix displays. Color filter stripes are formed extending in a roll up direction. The color filter can be arranged in the direction of the row electrodes or in the direction of the column electrodes as long as this direction is parallel to the roll direction. The stripes may be in combination with a fixing strip along one of the edges perpendicular to the rolling direction. The fixing strip thus binds the display effect layer and color filter layer along one of the non-rolling display edges. This secures the color filter, but permits movement between the pixel layer and the color filter layer.

Brightness decrease or color errors caused by alignment problems during display bending or rolling are avoided by patterning color filters into continuous stripes which extend in the roll up direction. The radius difference between a display effect layer and a color filter layer is substantially eliminated since misalignment between the color filters and the underlying pixels is eliminated. A conformable, flexible or roll up display includes a matrix display including lines of sub-pixels. The display can be any matrix display, active or passive. Each line has an associated color assigned to the line, and each line extends along a roll up or bend direction. A display effect layer is formed on the matrix layer. A color filter layer includes striped color filters which extend in the roll up or bend direction. The striped color filters each include a filter color corresponding with the lines of sub-pixels in the active matrix layer to address misalignment and color errors due to bending or rolling up the display. Methods for fabricating flexible displays are also disclosed.

It should be understood that the present claims and disclosure refer to rows, but the alignment of pixels may be performed in the column direction. The word row is employed for convenience to refer to a line of pixels having the same color designation. Advantages gained by the color filters being applied in accordance with these principles include elimination of misalignment problems that cause color error, parallax or other ill-effects, and ease of manufacture of the color filter layer.

These and other objects, features and advantages of the present disclosure will become apparent from the following detailed description of illustrative embodiments thereof, which is to be read in connection with the accompanying drawings.

BRIEF DESCRIPTION OF THE DRAWINGS

This disclosure will present in detail the following description of preferred embodiments with reference to the following figures wherein.

DETAILED DESCRIPTION OF THE DRAWINGS

The present disclosure provides embodiments for a flexible or roll up display that includes improved alignment between sub-pixels and a color filter to improve display viewing quality.

It should be understood that the elements shown in the FIGS. may be implemented in various configurations. For illustrative purposes, embodiments will be described herein in terms of an electrophoretic display type that includes polymeric substrates, which permit conformable, flexible or roll up displays to be formed. Other types of displays may also benefit from the teachings herein. For example, liquid crystal, electroluminescent displays, etc. may employ the teachings herein.

Figure 1:
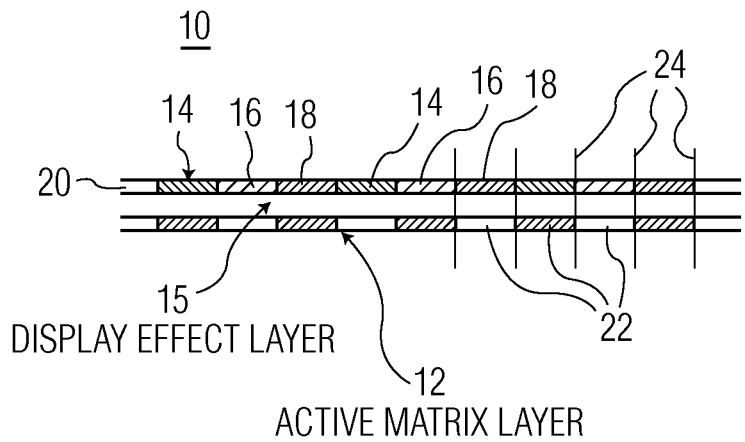
FIG. 1 is a cross-sectional view of a flexible display in accordance with the prior art.
Figure 2:
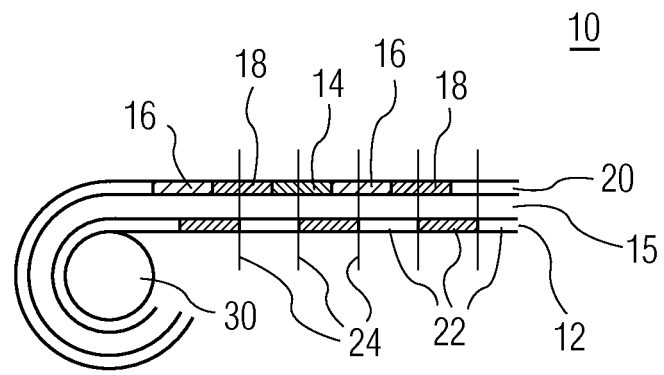
FIG. 2 is a cross-sectional view of the flexible display of FIG. 1 showing misalignment between sub-pixels and color filters.
Figure 3:
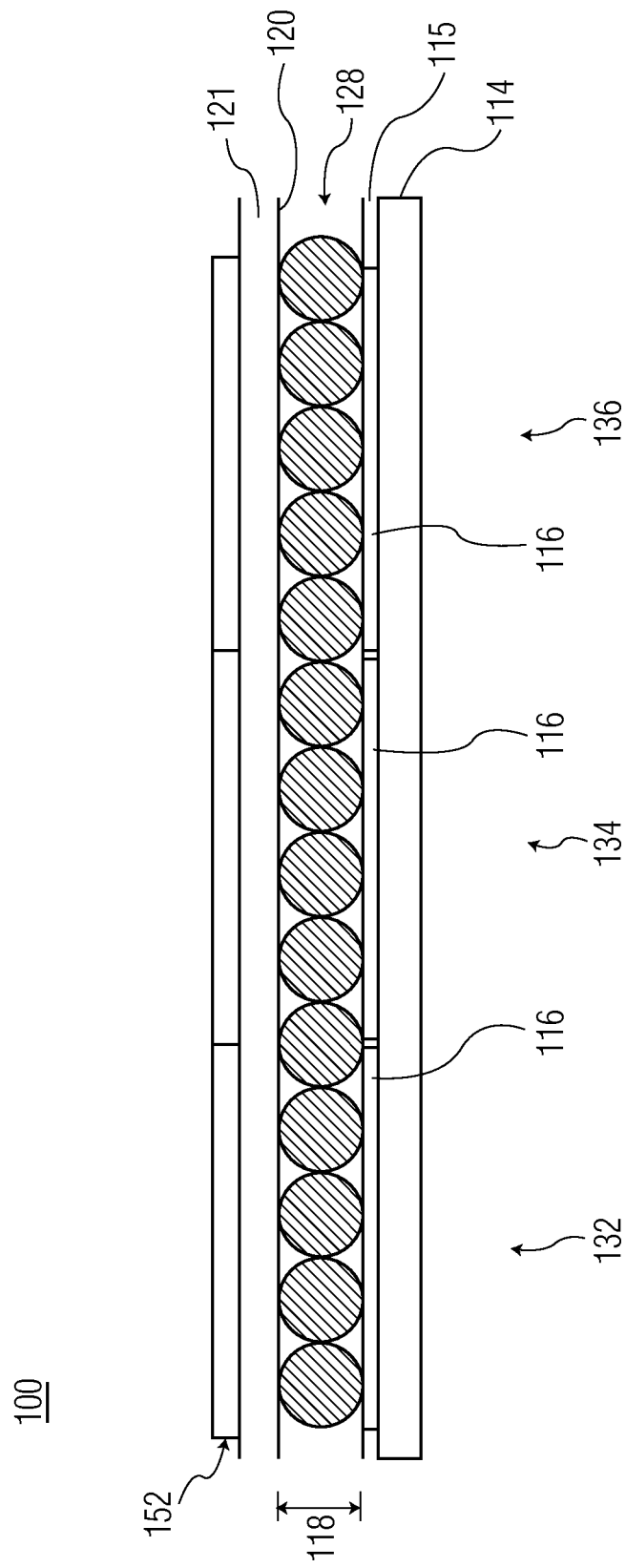
FIG. 3 is a cross-sectional view of a flexible display in accordance with one embodiment.

Referring now to the drawings in which like numerals represent the same or similar elements and initially to FIG. 3, a cross-sectional view of a conformable, flexible or roll up display 100 is shown in accordance with principles of one embodiment. A display effect layer 128 includes materials for the transmission and dispersion of light. In the embodiment of FIG. 3, the display effect layer 128 may include liquid crystal, electrophoretic display medium or any other emitting or reflective material for guiding light to a viewer. A backplane substrate 114 may include a flexible polymer material on which an active matrix layer 115 is formed including sub-pixels 116 and other electronic components. These electronic components may include transistors (thin film transistors TFT), capacitors, conductive lines, etc. For simplicity only sub-pixels 116 are shown. For a back lit embodiment, light is passed through substrate 114 or other back end device to provide light through sub-pixels 116. Other embodiments may include reflective displays where light is reflected from sub-pixels 116 from the viewing side of the sub-pixels 116. A cell gap 118 is filled with a display effect material, such as, e.g., liquid crystal, electrophoretic display medium (e.g., the capsules containing electrophoretic ink from the manufacturer E Ink Corporation) or other display effect material which is responsive to pixels 116. For example, when activated the pixels 116 cause orientation of the liquid crystal or a change in the E ink capsules as is known in the art. A substrate 121 may include a common electrode 120 formed thereon. The common electrode 120 cooperates with the sub-pixels 116 to orient or adjust the state of the adjacent display effect material. A color filter layer 152 is provided as part or substrate 121.

Figure 4:
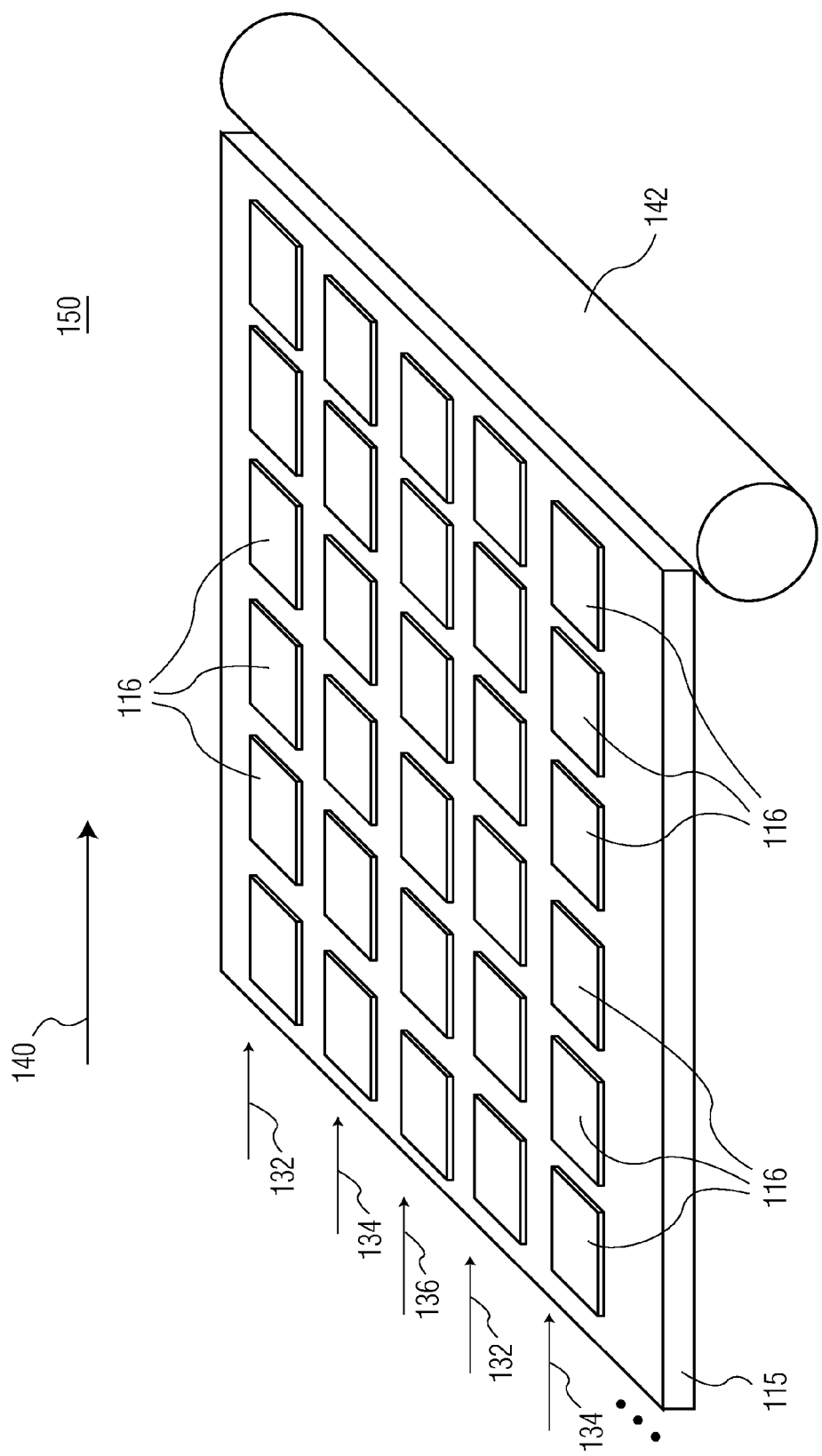
FIG. 4 is a perspective view of a sub-pixel array in accordance with another illustrative embodiment.

Referring to FIG. 4, a sub-pixel array 150 includes an arrangement of sub-pixels 116 which are configured to be assigned same color values in a linear relationship, e.g., in same rows or columns 132, 134 and 136 (referred to hereinafter as rows for ease of reference). Each row 132, 134 and 136 corresponds to a same color. Colored sub-pixels 116 of the display 100 are arranged into rows in a roll-up direction 140 (a roll 142 is shown in this view for illustrative purposes). The three color rows (e.g., Red 134, Green 136 and Blue 138) repeat across the display. While three color components are illustratively depicted and described, other arrangements may be provided. For example, in one embodiment, four row types may be employed (e.g., Red, Green, Blue and White (RGBW)). Each row (132, 134, and 136) is oriented in the roll up direction 140, which is transverse to a longitudinal axis of a spool or roll 142.

Figure 5:
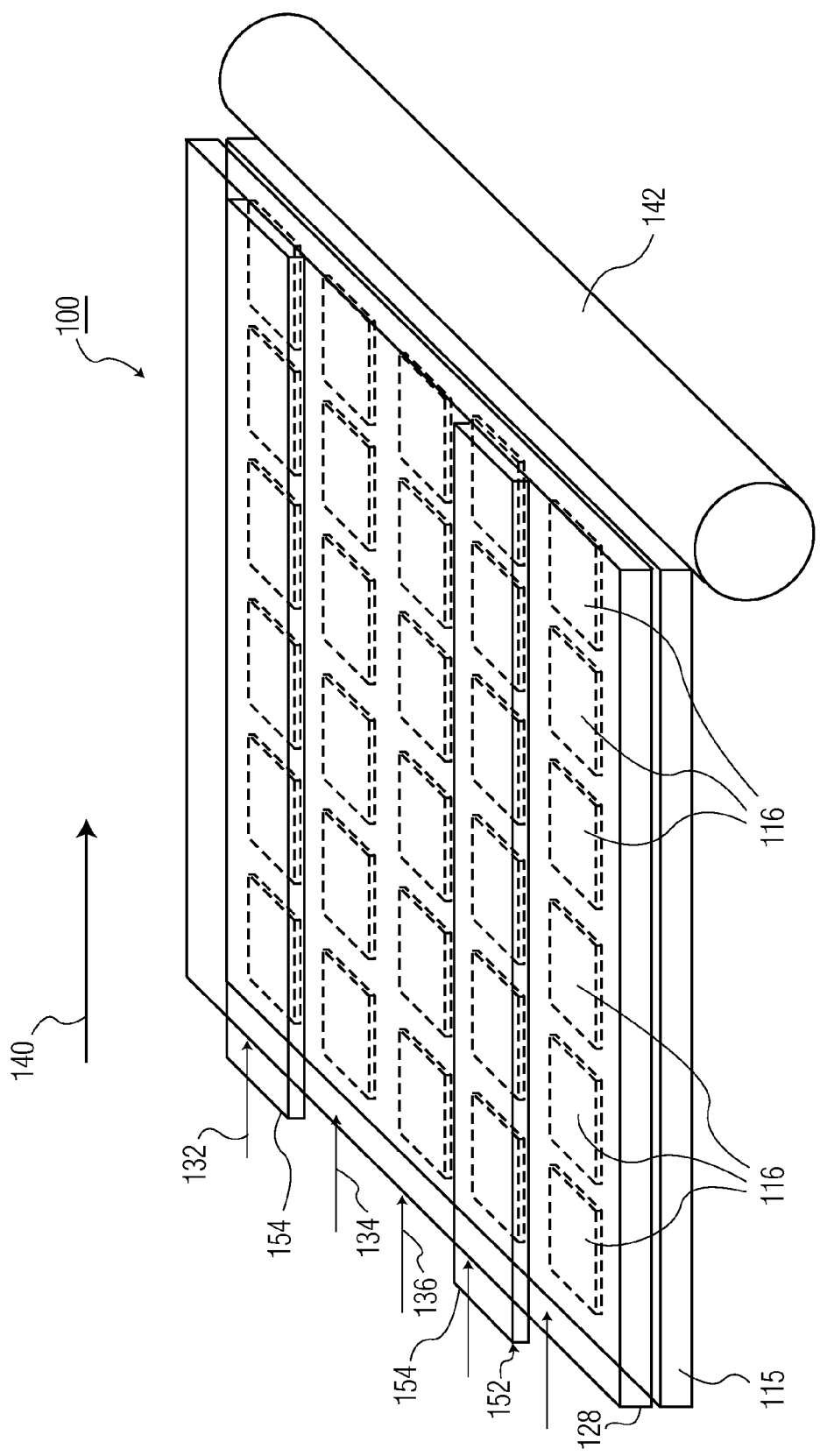
FIG. 5 is a perspective view of the sub-pixel array with a display effect layer having color filter stripes formed thereon in accordance with an illustrative embodiment.

Referring to FIG. 5, the rollable color display 100 has the display effect layer 128 formed and a color filter layer 152 is to be placed in alignment with the sub-pixels 116 on an active/passive matrix layer 115. The color filter layer 152 may be fabricated and placed in a plurality of different ways. The color filter layer 152 may be formed by a deposition and photolithographic patterning over the display effect layer 128. For example, a first color is deposited followed by a patterning process which forms longitudinal stripes 154 of the first color in the direction of the roll up 140. Each stripe 154 of the first color corresponds to and is aligned in a direction transverse to the roll up direction 140. Similar processing is performed to define stripes 154 for the other color filters corresponding to the sub-pixels 116 of that color. Color filters may include materials of between about 100 nm and about 10 microns in thickness and are preferably polymeric materials, which may be known.

Figure 6:
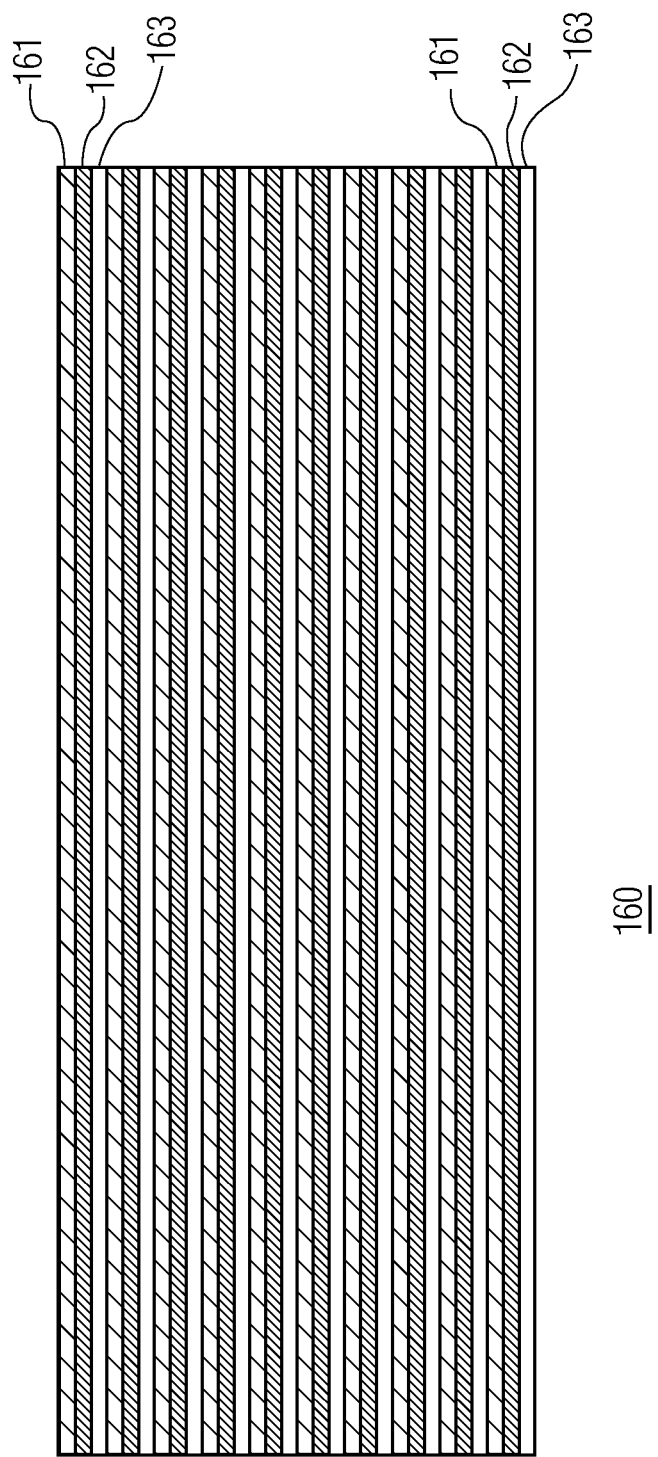
FIG. 6 is a top view of an illustrative color filter sheet.

In alternate embodiments, a color filter layer 152 may be formed by spin coating, spray coating, evaporating, doctor blading or similar deposition methods. In one embodiment, the color filter layer is formed as a sheet having alternating color components as illustratively shown in FIG. 6. A color filter sheet 160 may be formed in a single sheet having different colors 161-163 alternating thereon. Sheet 160 may include a thin polymeric material fabricated in an extrusion process. Sheet 160 may be glued or otherwise adhered to the display 100 (FIG. 3) to provide color filter layer 152.

Advantageously, the color filter layer 152 need only be concerned about a sub-pixel pitch in a direction transverse to the roll-up direction 140. This makes alignment much easier between the sub-pixels 116 and the color filters. In the present disclosure, colored sub-pixels 116 are arranged in horizontal stripes. This can have implications on the arrangement of rows and columns on the display and thereby the performance needed from driving or backplane electronics.

Figure 7:
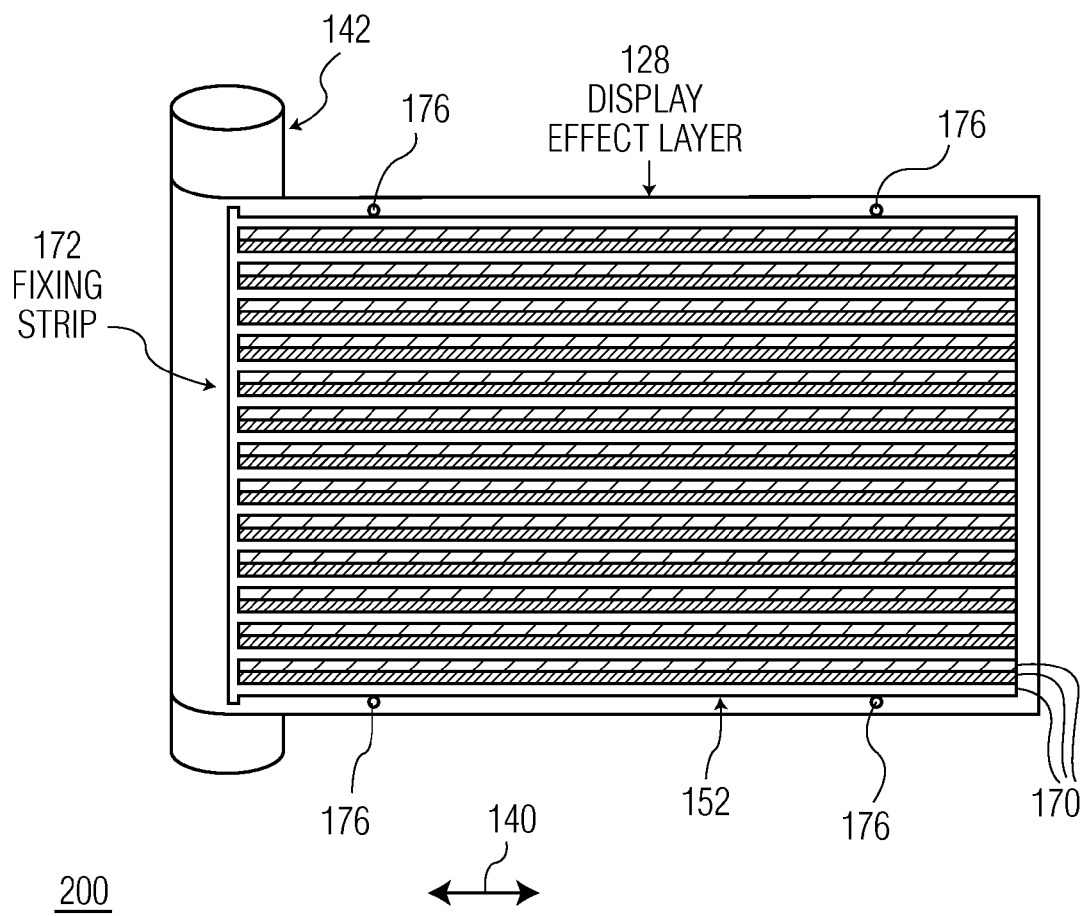
FIG. 7 is a top view of the flexible display showing a fixing strip and/or spots for securing the color filter stripes.

Referring to FIG. 7, color filter stripes 170 may be secured using a fixing strip 172 along one of the edges perpendicular to the rolling direction 140. The fixing strip 172 binds the display effect layer 128 and color filter layer 152 along one of the non-rolling display edges. As described, brightness decreases and/or color errors caused by alignment problems during display bending or rolling are avoided by patterning color filters into continuous stripes 170 which extend in the roll up direction 140. A radius difference between the display effect layer 128 and the color filter layer 152 is substantially eliminated since misalignment between the color filters and the underlying pixels is eliminated. No brightness decrease or color errors will occur.

FIG. 7 illustratively shows an RGB (red, green, blue) color display 200 according to one embodiment. However, arrangements other than RGB, such as RGBW RBG White) or CMY (Cyan, Magenta, Yellow) may be employed. Black stripes (boot shown) may also be employed between the colored stripes 170 to separate or delineate the stripes 170. It should be understood that pixels comprised of three sub-pixels are arranged together such that three adjacent rows cover the three sub-pixels needed for a pixel image. The color filter stripes need not continuously alternate, e.g., RGB; RGB, etc.; instead other arrangement are possible, e.g., RGB, BGR, RGB, so that the same colors in this case B and R can be formed adjacent to one another. This may ease tolerances and improve manufacturability.

Depending on the lamination glue properties of fixing strip 172, fixing strip may be employed to fix the display effect layer 128 and color filter layer 152 along one of the non-rolling display edges to prevent un-wanted drifting of the two layers with respect to each other. Fixing strip 170 may be employed along one side of the display 200, and permit the movement of color filter layer 152 relative to the display effect layer without color errors due to bending or roll up. Other arrangements are also possible, such as, e.g., employing one or more fixing spots 176 at opposite sides of the display 200.

Figure 8:
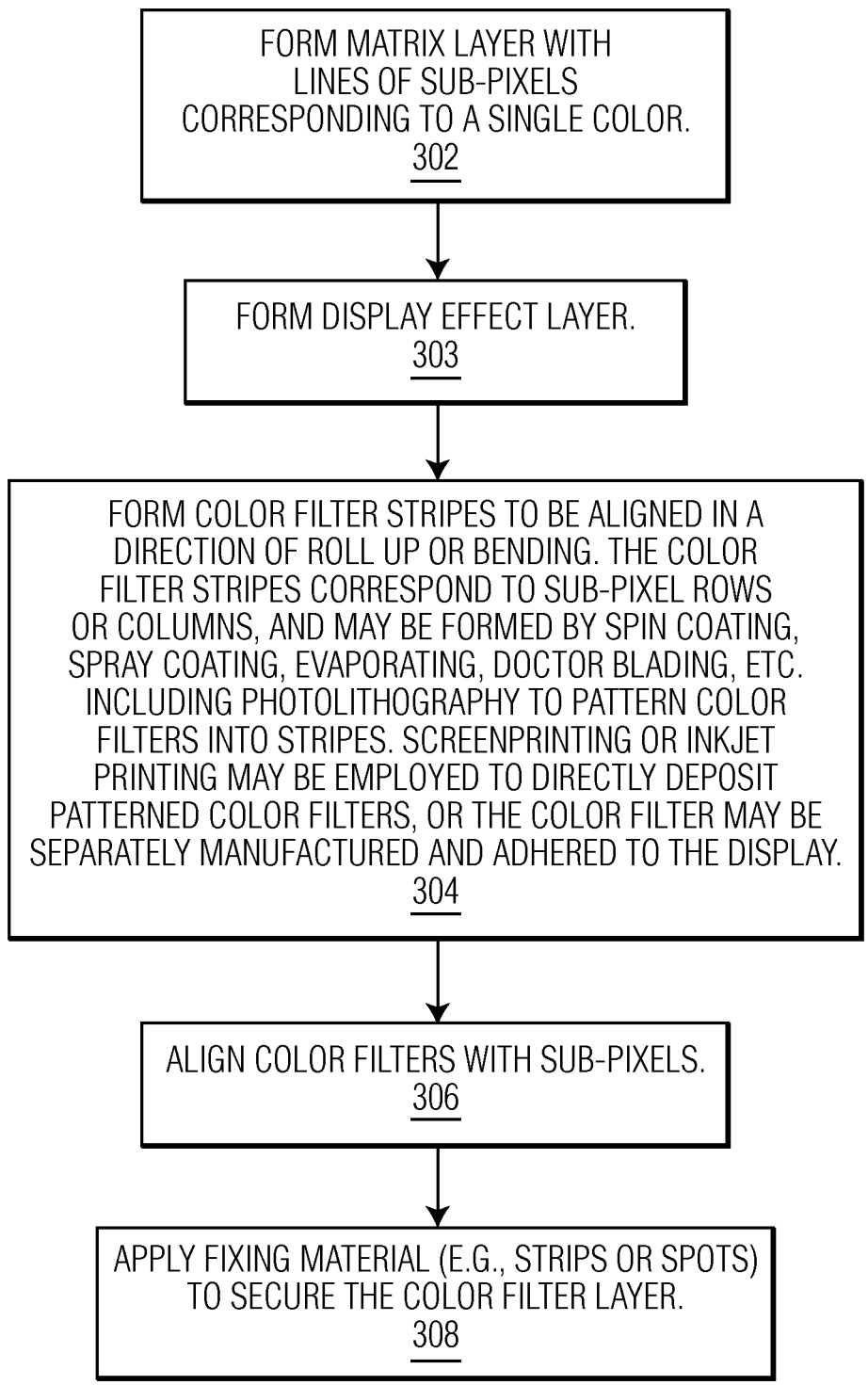
FIG. 8 is a flow diagram showing illustrative methods for fabricating a color filter in accordance with embodiments of the present invention.

Referring to FIG. 8, a flow diagram describing methods for fabricating a flexible/roll-up display with a striped color filter is shown. Horizontal and vertical will be illustratively used to designate relative orientation of color filters and sub-pixels. Other directions and orientations may also be employed. In block 302, a display device is provided having an active/passive matrix with sub-pixels being arranged in alternating horizontal rows in accordance with color. A display effect layer is formed or provided in block 303 along with other components as needed in preparation of a color filter layer. In block 304, a color filter layer is formed by forming striped color filters horizontally over a corresponding color sub-pixel row. Many processes may be employed for forming the color filter. For example, spin coating, spray coating, evaporating, doctor blading or similar deposition methods may be employed to form the color filters. The formation of the color filter may include photolithography to pattern color filters into stripes or patches, followed by a next color filter deposition and patterning until all color filters are formed. Screen-printing or inkjet printing may be employed to directly deposit patterned color filters. The color filter may be separately manufactured and placed in alignment as follows.

In block 306, alignment of the color filter is performed relative to the sub-pixel pitch. Advantageously, alignment is only needed in the vertical direction along the length of the display. In block 308, a fixing strip, strips or spots are placed to secure the color filter layer to the display effect layer. Processing continues as needed.

Having described preferred embodiments for a roll up display with color filters and methods for fabrication of the same (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the embodiments disclosed herein as outlined by the appended claims. Having thus described the details and particularity required by the patent laws, what is claimed and desired protected by Letters Patent is set forth in the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function; and
e) no specific sequence of acts is intended to be required unless specifically indicated.

The invention claimed is:

1. A flexible, rollable or conformable display, comprising:
a matrix display layer with a spool applied at an end of the matrix display layer, the matrix display layer including lines of sub-pixels, each line having an associated color assigned to the line, each line extending along a roll up or bend direction which is perpendicular to a longitudinal axis of the spool;
a display effect layer formed on the matrix layer;
a color filter layer including striped color filters which extend in the roll up or bend direction, the striped color filters each include a filter color corresponding with the lines of sub-pixels in the matrix layer to address misalignment and color errors due to bending or rolling up the display; and
a fixing material applied at an end portion of the display to couple the display effect layer to the color filter layer, wherein the fixing material includes a stripe applied perpendicularly to the roll up or bend direction at an end portion of the color filter layer.

2. The display as recited in claim 1, wherein the striped color filters are manufactured separately from the display and are attached to the display by an adhesive.

3. The display as recited in claim 1, wherein the striped color filters are formed by deposition and patterning using photolithography.

4. A flexible, rollable or conformable display, comprising:
a matrix display layer with a spool disposed at an end of the matrix display layer, the matrix display layer including lines of sub-pixels, each line having an associated color assigned to the line, each line extending along a roll up or bend direction which is perpendicular to a longitudinal axis of the spool, the lines being arranged to include a single color component;
a display effect layer formed on the matrix layer;
a color filter layer formed on the display effect layer and including striped color filters, each striped color filter being associated with the single color component of a corresponding line of sub-pixels and the striped color filter formed to cover the line of sub-pixels, the striped color filters extending in the roll up or bend direction to address misalignment and color errors due to bending or rolling up the display; and
a fixing material applied at an end portion of the display to couple the display effect layer to the color filter layer, wherein the fixing material includes a stripe applied perpendicularly to the roll up or bend direction at an end portion of the color filter layer.

5. A flexible, rollable or conformable display, comprising:
a matrix display layer with a spool applied at an end of the matrix display layer, the matrix display layer including lines of sub-pixels, each line having an associated color assigned to the line, each line extending along a roll up or bend direction which is perpendicular to a longitudinal axis of the spool;
a display effect layer formed on the matrix layer;
a color filter layer including striped color filters which extend in the roll up or bend direction, the striped color filters each include a filter color corresponding with the lines of sub-pixels in the matrix layer to address misalignment and color errors due to bending or rolling up the display; and
a fixing material applied at an end portion of the display to couple the display effect layer to the color filter layer, wherein the fixing material includes a plurality of spots applied at end portions of the color filter layer.

6. The display as recited in claim 5, wherein the striped color filters are manufactured separately from the display and are attached to the display by an adhesive.

7. The display as recited in claim 5, wherein the striped color filters are formed by deposition and patterning using photolithography.

8. A flexible, rollable or conformable display, comprising:
a matrix display layer with a spool disposed at an end of the matrix display layer, the matrix display layer including lines of sub-pixels, each line having an associated color assigned to the line, each line extending along a roll up or bend direction which is perpendicular to a longitudinal axis of the spool, the lines being arranged to include a single color component;
a display effect layer formed on the matrix layer;
a color filter layer formed on the display effect layer and including striped color filters, each striped color filter being associated with the single color component of a corresponding line of sub-pixels and the striped color filter formed to cover the line of sub-pixels, the striped color filters extending in the roll up or bend direction to address misalignment and color errors due to bending or rolling up the display; and
a fixing material applied at an end portion of the display to couple the display effect layer to the color filter layer, wherein the fixing material includes a plurality of spots applied at end portions of the color filter layer.

9. The display as recited in claim 8, wherein the striped color filters are manufactured separately from the display and are attached to the display by an adhesive.

10. The display as recited in claim 8, wherein the striped color filters are formed by deposition and patterning using photolithography.

* * * * *

UNITED STATES PATENT AND TRADEMARK OFFICE
CERTIFICATE OF CORRECTION

| | | |
|---|---|---|
| PATENT NO. | : 8,446,549 B2 | Page 1 of 1 |
| APPLICATION NO. | : 12/091710 | |
| DATED | : May 21, 2013 | |
| INVENTOR(S) | : Hjalmar Edzer Ayco Huitema et al. | |

It is certified that error appears in the above-identified patent and that said Letters Patent is hereby corrected as shown below:

On the Title Page, item (22) should read

PCT Filed: Nov. 14, 2006

Signed and Sealed this
Twenty-fifth Day of March, 2014

Michelle K. Lee
*Deputy Director of the United States Patent and Trademark Office*